United States Patent
Sato et al.

(10) Patent No.: US 10,605,308 B2
(45) Date of Patent: Mar. 31, 2020

(54) ROTARY SEAL

(71) Applicant: NAKANISHI METAL WORKS CO., LTD., Osaka-shi (JP)

(72) Inventors: Takahiko Sato, Osaka (JP); Shinichi Akashi, Osaka (JP); Yusuke Iizawa, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 15/907,553

(22) Filed: Feb. 28, 2018

(65) Prior Publication Data

US 2018/0258996 A1    Sep. 13, 2018

(30) Foreign Application Priority Data

Mar. 10, 2017 (JP) ................. 2017-045678

(51) Int. Cl.
| | |
|---|---|
| *F16C 33/78* | (2006.01) |
| *F16J 15/32* | (2016.01) |
| *F16J 15/3256* | (2016.01) |
| *F16J 15/3232* | (2016.01) |
| *F16J 15/3264* | (2016.01) |

(Continued)

(52) U.S. Cl.
CPC ........ *F16C 33/7889* (2013.01); *F16C 19/184* (2013.01); *F16C 19/186* (2013.01); *F16C 33/7823* (2013.01); *F16C 33/7883* (2013.01); *F16J 15/3232* (2013.01);

(Continued)

(58) Field of Classification Search
CPC ................ F16C 19/184; F16C 33/7823; F16C 33/7889; F16C 33/7883; F16C 2326/02; F16J 15/3232; F16J 15/3256; F16J 15/3264; B60B 27/0073
See application file for complete search history.

(56) References Cited

U.S. PATENT DOCUMENTS

2008/0107369 A1* 5/2008 Fujita ............... F16C 33/34
                                                                384/463
2010/0052262 A1* 3/2010 Ishida ............... F16C 41/007
                                                                277/349

(Continued)

FOREIGN PATENT DOCUMENTS

JP    4997532 B2    8/2012
JP    5234651 B2    7/2013

*Primary Examiner* — Alan B Waits
(74) *Attorney, Agent, or Firm* — Kratz, Quintos & Hanson, LLP

(57) ABSTRACT

There is provided a rotary seal having uneven surfaces formed on sliding contact surfaces of a slinger with which seal lip portions of a seal member come in contact, in which wear of the seal lip portions is reduced, resulting in increased reliability. The rotary seal 1 includes: a core metal 3; the seal member 4 having a base portion 4A joined to the core metal 3 and the seal lip portions 4B, 4C, and 4D; and the slinger 2 having the sliding contact surfaces A and B with which the seal lip portions 4B, 4C, and 4D come in contact, in which each of the sliding contact surfaces A and B is in such a surface condition that an arithmetic average roughness Ra satisfies $0.3\ \mu m \leq Ra \leq 1.0\ \mu m$, a skewness of roughness curve Rsk satisfies $Rsk \leq -1$, and an average length of roughness curve element RSm satisfies $100\ \mu m \leq RSm$, Ra, Rsk, and RSm defined by JIS B 0601:2013.

6 Claims, 4 Drawing Sheets

(51) Int. Cl.
*F16C 19/18* (2006.01)
*B60B 27/00* (2006.01)

(52) U.S. Cl.
CPC ....... *F16J 15/3256* (2013.01); *F16J 15/3264* (2013.01); *B60B 27/0073* (2013.01); *F16C 2326/02* (2013.01)

(56) References Cited

U.S. PATENT DOCUMENTS

| | | | |
|---|---|---|---|
| 2010/0092121 A1* | 4/2010 | Hanano | C23C 2/26 384/527 |
| 2011/0092297 A1* | 4/2011 | Takabe | F16D 3/845 464/106 |
| 2016/0059627 A1* | 3/2016 | Komai | B60B 27/005 384/446 |

* cited by examiner

ROTARY SEAL

BACKGROUND OF THE INVENTION

(1) Field of the Invention

The present invention relates to a rotary seal formed by a core metal, a seal member having a base portion joined to the core metal and a seal lip portion, and a slinger having sliding contact surfaces with which the seal lip portion comes in sliding contact.

(2) Description of Related Art

As a rotary seal used for a bearing device or the like for supporting a wheel of an automobile, there is a rotary seal including a slinger formed by a cylindrical sleeve and a flange extending radially outward from one end in an axial direction of the sleeve, a core metal formed by a cylindrical core metal cylinder and a core metal flange extending radially inward from one end in an axial direction of the core metal cylinder, and a seal member formed by a base portion joined to the core metal and seal lip portions extending from the base portion (see Japanese Patent No. 4997532 and Japanese Patent No. 5234651, for example).

Such a rotary seal is used with the sleeve mounted to a radially inner member and the core metal cylinder mounted to a radially outer member and the seal lip portions come in sliding contact with sliding contact surfaces of the slinger.

From perspectives of energy cost reduction and greenhouse gas reduction, there is a huge growing social demand for improvement in fuel economy of an automobile and the like.

In view of such social demand, uneven surfaces are formed on the sliding surfaces of the slinger by surface machining in each of the rotary seals in Japanese Patent No. 4997532 and Japanese Patent No. 5234651 in order to improve oil film retention between the seal lip portions and the sliding contact surfaces to thereby reduce rotary torque of the rotary seal.

For example, in Japanese Patent No. 4997532, the uneven surfaces having a large number of dimples are formed on the sliding contact surfaces by shot peening in which ultrafine rigid particles hit the sliding contact surfaces.

In Japanese Patent No. 5234651, the uneven surfaces having fine-pitched roughness without edges are formed on the sliding contact surfaces by cutting, unevenness transfer machining, shot peening, or the like.

In the rotary seal in each of Japanese Patent No. 4997532 and Japanese Patent No. 5234651, the uneven surfaces are formed on the sliding contact surfaces of the slinger by the surface machining in order to reduce the rotary torque.

However, the structure with the uneven surfaces formed on the sliding contact surfaces of the slinger is formed without consideration of wear of the seal lip portions of the seal member caused by sliding contact of the seal lip portions with the uneven surfaces and the wear of the seal lip portions may degrade reliability. Moreover, grease dries out due to long-term use, which may promote the wear of the seal lip portions to degrade the reliability.

SUMMARY OF THE INVENTION

With the above-described background in view, an object of the present invention is to increase reliability by reducing wear of seal lip portions of a seal member in a rotary seal with an uneven surface formed on sliding contact surfaces of a slinger with which the seal lip portions come in contact.

To achieve the above-described object, according to the present invention, there is provided a rotary seal including: a core metal; a seal member having a base portion joined to the core metal and a seal lip portion; and a slinger having at least one sliding contact surface with which the seal lip portion comes in contact, in which the at least one sliding contact surface has a surface condition that an arithmetic average roughness Ra satisfies 0.3 µm≤Ra≤1.0 µm, a skewness of roughness curve Rsk satisfies Rsk≤−1, and an average length of roughness curve element RSm satisfies 100 µm≤RSm, Ra, Rsk, and RSm defined by JIS B 0601:2013.

With this structure, because the values indicating the surface conditions of the sliding contact surfaces of the slinger with which the seal lip portion of the seal member comes in contact are in the above-described ranges, it is possible to greatly reduce a wear amount of the seal lip portion to thereby increase reliability as compared with the sliding contact surfaces on which the uneven surfaces are formed by the surface machining such as the shot peening treatment as in Japanese Patent No. 4997532 and Japanese Patent No. 5234651.

Furthermore, even when the grease dries out due to long-term use, the wear of the seal lip portions can be suppressed and therefore it is possible to provide the rotary seal with higher reliability.

Here, preferably, the core metal is formed by a cylindrical core metal cylinder and a core metal flange extending radially inward from one end in an axial direction of the core metal cylinder, the slinger is formed by a cylindrical sleeve and a flange extending radially outward from one end in the axial direction of the sleeve, the at least one sliding contact surface includes a first sliding contact surface and a second sliding contact surface, and the seal lip portion of the seal member has an axial lip that comes in sliding contact with the first sliding contact surface on an inner surface of the flange of the slinger and a radial lip that comes in sliding contact with the second sliding contact surface of an outer peripheral surface of the sleeve of the slinger.

Because the wear amount of the seal lip portion of what is called a pack seal can be greatly reduced, this structure is suitable for the pack seal.

Best preferably, the slinger is manufactured by press working on a dull-finished steel plate material.

With this structure, because the slinger is manufactured simply by press working on the dull-finished steel plate material, it is possible to reduce manufacturing cost as compared with the sliding contact surfaces on which the uneven surfaces are formed by the surface machining such as the shot peening treatment as in Japanese Patent No. 4997532 and Japanese Patent No. 5234651.

As described above, the rotary seal according to the present invention exerts the remarkable effects, i.e., reduction of the wear of the seal lip portion and increase of the reliability, in the rotary seal with the uneven surfaces formed on the sliding contact surfaces of the slinger with which the seal lip portion comes in contact.

DETAILED DESCRIPTION OF PREFERRED EMBODIMENT

Next, an embodiment of the present invention will be described in detail based on the accompanying drawings. The present invention is not limited to the embodiment shown in the accompanying drawings and includes all the embodiments satisfying requirements described in the claims.

In the present description, a direction of a rotating shaft of a radially inner member that is a member on a rotating side when a rotary seal is mounted will be referred to as "axial direction" and a direction orthogonal to the axial direction will be referred to as "radial direction".

A direction from a vehicle body of an automobile toward a wheel will be referred to as "outward direction" and an opposite direction will be referred to as "inward direction".
<Bearing Device>

Figure 1:
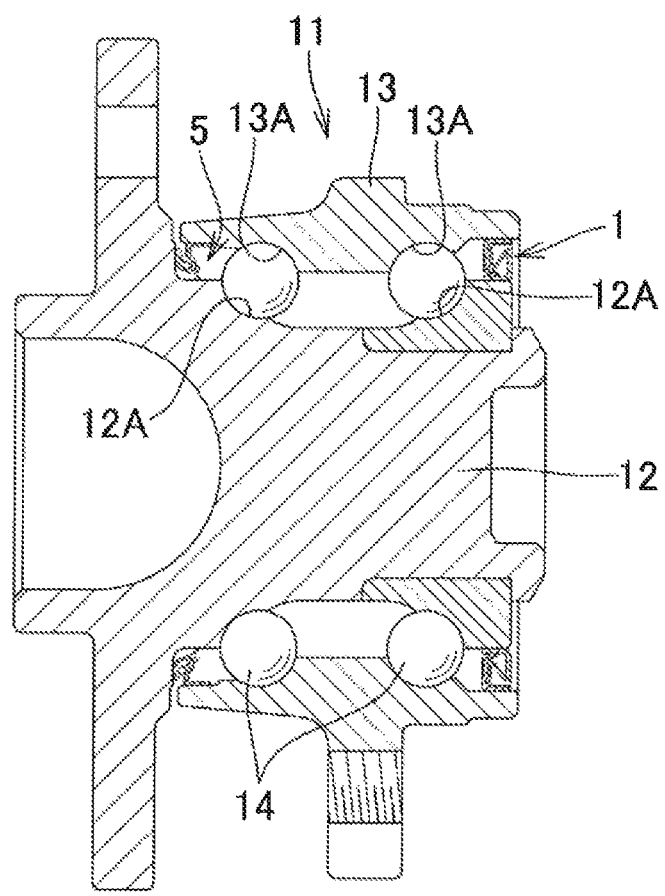
FIG. 1 is a partial vertical sectional schematic view showing an example in which a rotary seal according to an embodiment of the present invention is used for a bearing device for supporting a wheel of an automobile.

A partial vertical sectional schematic view in FIG. 1 shows an example in which a rotary seal 1 according to the embodiment of the present invention is used for a bearing device 11 for supporting a wheel of an automobile.

The bearing device 11 includes a bearing having an inner ring 12 that has inner ring track surfaces 12A on an outer peripheral surface and that rotates with the wheel, an outer ring 13 that has outer ring track surfaces 13A on an inner peripheral surface and that is integral with the vehicle body, balls 14, 14, . . . that are rolling elements rolling between the inner ring track surface 12A and the outer ring track surface 13A, and the like.

The bearing device 11 also includes the rotary seals 1 and 5 that prevent entry of mud water or the like and leakage of lubricating grease at inner and outer end portions between the inner ring 12 and the outer ring 13 (on an inner side of the inner balls 14, . . . and an outer side of the outer balls 14, . . . ).
<Rotary Seal>

Figure 2:
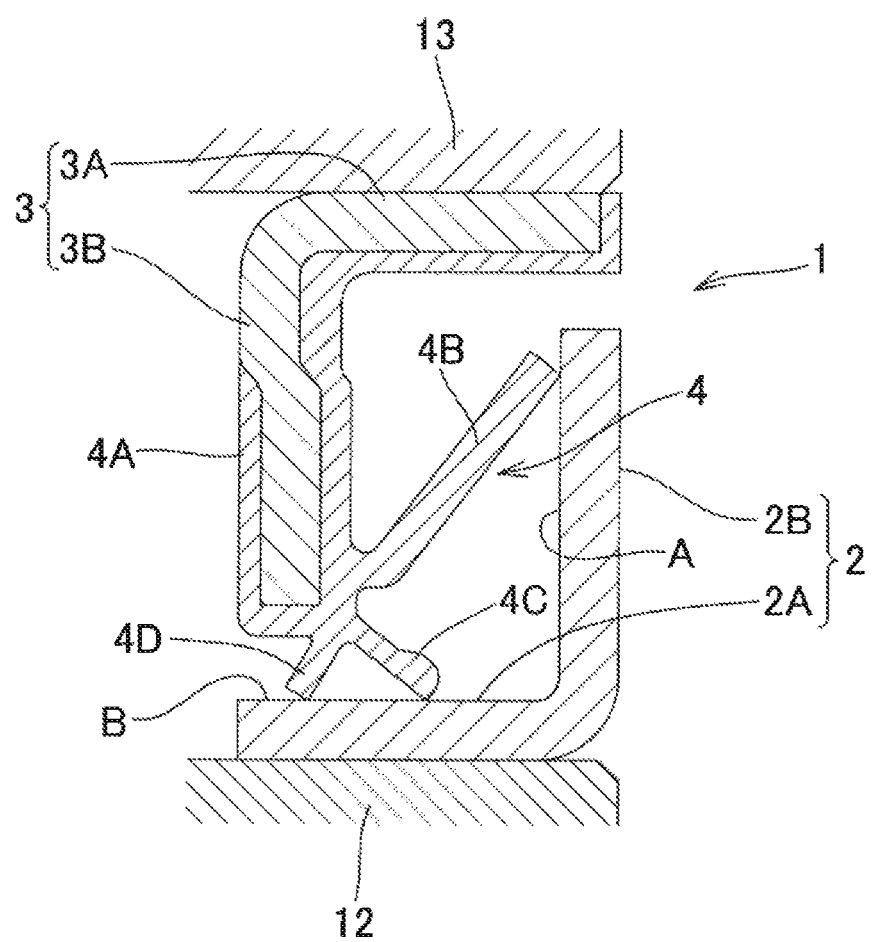
FIG. 2 is an enlarged vertical sectional view of a relevant part of the rotary seal according to the embodiment of the present invention.

As shown in an enlarged vertical sectional view of a relevant part in FIG. 2, each of the rotary seals 1 according to the embodiment of the present invention is formed by a core metal 3 manufactured by press working on a stainless steel plate, a seal member 4 that is an elastic body such as rubber having a base portion 4A joined to the core metal 3 and seal lip portions 4B, 4C, and 4D, a slinger 2 having sliding contact surfaces A and B with which the seal lip portions 4B, 4C, and 4D come in sliding contact and manufactured by press working on a stainless steel plate.

The slinger 2 is manufactured by press working on a dull-finished ("dull finish" in JIS G 0203:2009 Glossary of terms used in iron and steel) material and uneven surfaces in required surface conditions are formed on the sliding contact surfaces A and B without performing surface machining such as shot peening treatment as in Japanese Patent No. 4997532 and Japanese Patent No. 5234651.

As synthetic rubber material forming the seal member 4, one of the following rubber materials with preferable oil resistance may be used or two or more of them may be properly blended with each other and used: nitrile-butadien rubber (NBR), hydrogenated nitrile-butadien rubber (HNBR), acrylic rubber (ACM), ethylene-acrylic rubber (AEM), fluoro rubber (FKM, FPM), silicone rubber (VQM), and the like. In consideration of ease of kneading, ease of vulcanization, and adhesiveness to the core metal 3 of the rubber material, it is also preferable to blend the rubber material with other kinds of rubber such as liquid NBR, ethylene-propylene rubber (EPDM), natural rubber (NR), isoprene rubber (IR), styrene-butadiene rubber (SBR), and butadiene rubber (BR).

The core metal 3 is formed by a cylindrical core metal cylinder 3A and a core metal flange 3B extending radially inward from one end in an axial direction of the core metal cylinder 3A and the core metal 3 and the seal member 4 are fixed to the outer ring 13 by press-fitting the core metal cylinder 3A into the outer ring 13 that is a radially outer member.

The slinger 2 is formed by a cylindrical sleeve 2A and a flange 2B extending radially outward from one end in the axial direction of the sleeve 2A and the slinger 2 is fixed to the inner ring 12 by press-fitting the sleeve 2A into the inner ring 12 that is a radially inner member.

A tip end of the seal lip portion 4B that is an axial lip of the seal member 4 comes in sliding contact with the sliding contact surface A of an inner surface of the flange 2B of the slinger 2 and tip ends of seal lip portions 4C and 4D that are radial lips of the seal member 4 come in sliding contact with the sliding contact surface B of an outer peripheral surface of the sleeve 2A of the slinger 2.

Each of the sliding contact surfaces A and B of the slinger 2 manufactured by press working on the dull-finished steel plate material is in such a surface condition that an arithmetic average roughness Ra satisfies 0.3 µm≤Ra≤1.0 µm, a skewness of roughness curve Rsk satisfies Rsk≤−1, and an average length of roughness curve element RSm satisfies 100 µm≤RSm, Ra, Rsk, and RSm defined by JIS B 0601: 2013.

Here, the skewness of the roughness curve Rsk represents symmetry of a peak and a valley of roughness. The skewness of the roughness curve Rsk is a positive value when the peak of the roughness is more acute while it is a negative value when the valley of the roughness is more acute.

The average length of the roughness curve element RSm represents an average length of a contour curve element in a range of a standard length.
<Wear Amount Measurement Examination for Seal Lip Portions>

Experimental Method

Based on "7. Method and Procedure for Evaluation Using Stylus Surface Roughness Measuring Instrument" in JIS B 0633:2001 (ISO 4288:1996), a roughness curve in a circumferential direction perpendicular to a rolling direction of each of sliding contact surfaces of seal lips of the following examples and comparative examples was measured and an arithmetic average roughness Ra, a skewness of a roughness curve Rsk, and an average length of a roughness curve element RSm were measured with a standard length defined as 0.8 mm and an evaluation length defined as 4 mm and by using a stylus surface roughness measuring instrument (a surface roughness/contour shape measuring instrument manufactured by TOKYO SEIMITSU CO., LTD, model number: SURFCOM1800D).

A wear amount measurement examination for measuring wear amounts of the seal lips after rotation for 60 hours at a rotation speed of 1000 rpm was conducted for each of rotary seals into which the slingers according to the examples and the comparative examples were mounted and which were filled with different amounts of grease (normal: 0.24 g and very little: 0.005 g) and not filled with grease (no grease).

In the wear amount measurement examination, the wear amount of the axial lip 4B in FIG. 2 and the wear amount of the radial lip 4C in FIG. 2 were measured.

Examples

Three test specimens which were the slingers formed by press working on the dull-finished steel plates were used as Examples 1 to 3.

Comparative Examples

Three test specimens which were the slingers formed by press working on the dull-finished steel plates and shot blasting treatment on the sliding contact surfaces were used as Comparative Examples 1 to 3.

Experimental Results

Figure 3:
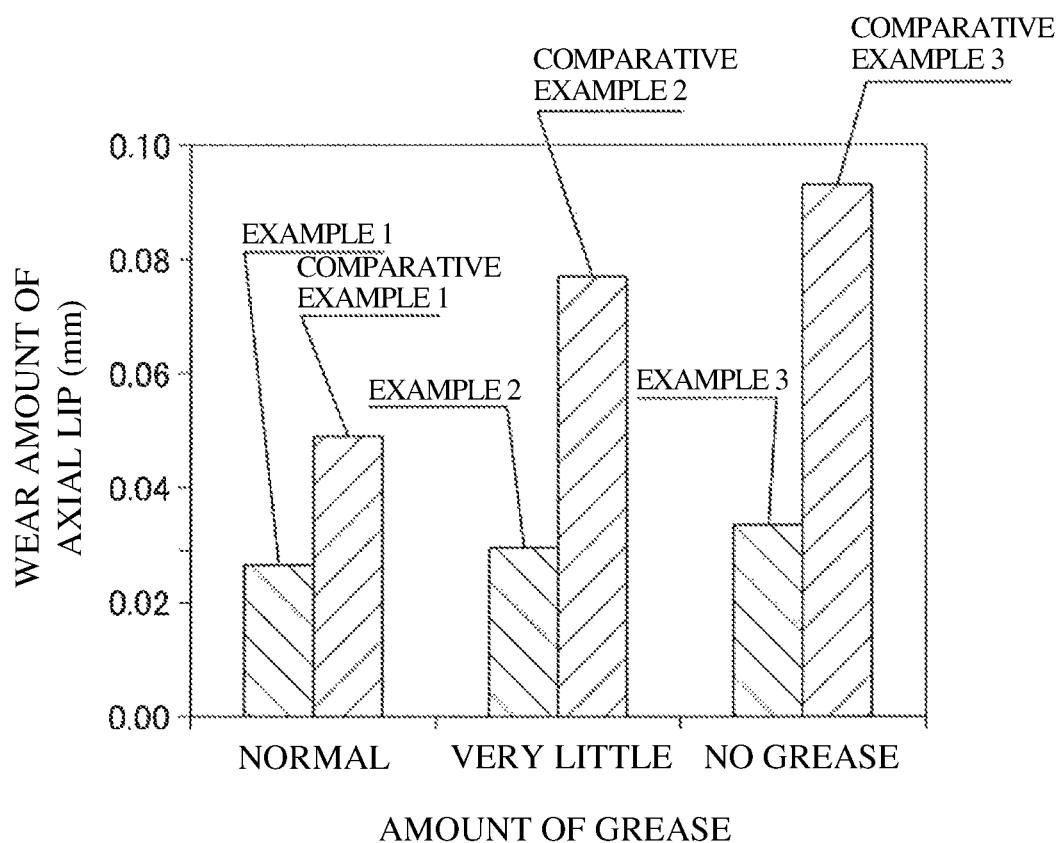
FIG. 3 is a bar graph for comparing wear amounts of axial lips between examples and comparative examples.
Figure 4:
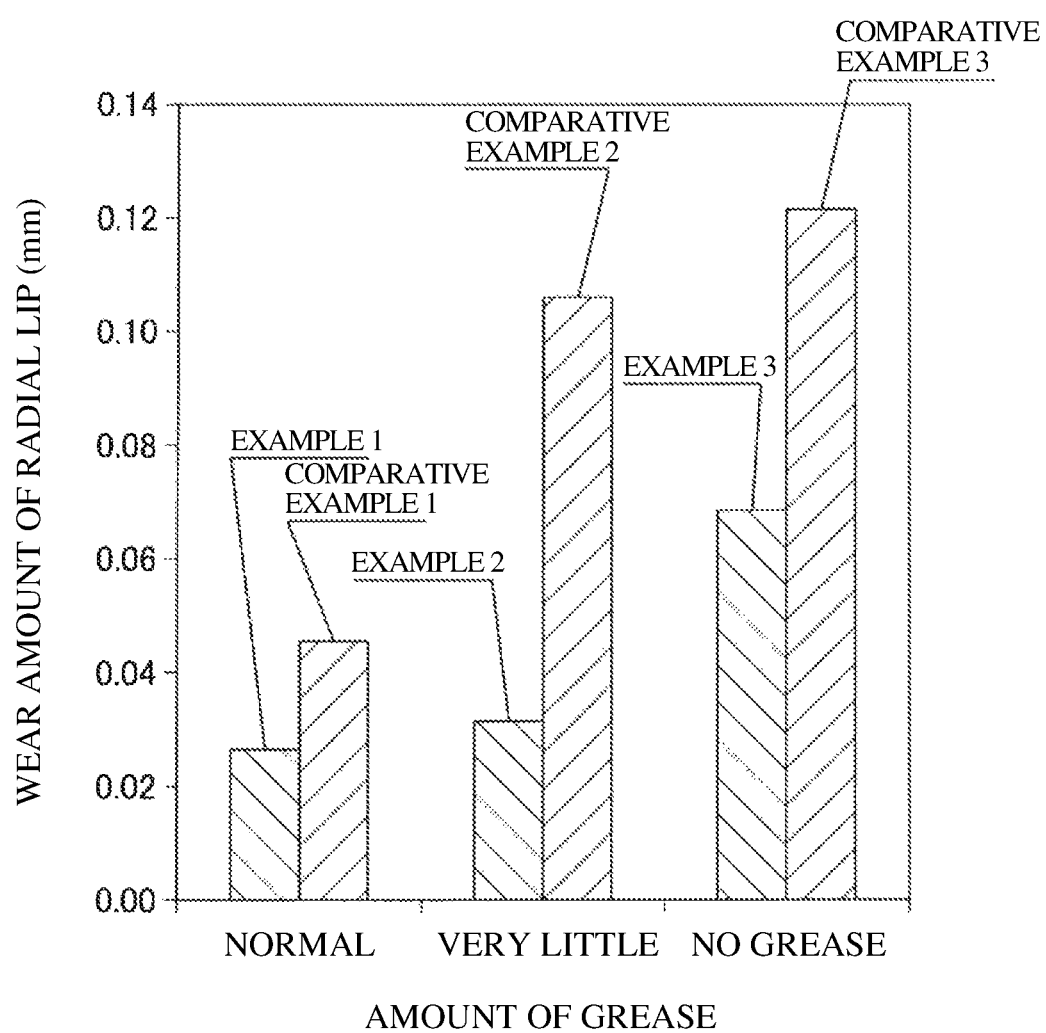
FIG. 4 is a bar graph for comparing wear amounts of radial lips between the examples and the comparative examples.

Experimental Results are shown in Table 1 and FIGS. 3 and 4.

Roughness parameters Ra, Rsk, and Rsm in each of Examples 1 to 3 and Comparative Examples 1 to 3 are as shown in Table 1.

The arithmetic average roughness Ra in each of Examples 1 to 3 and Comparative Examples 1 to 3 is about 0.4 µm to 0.5 µm and in a range of 0.3 µm≤Ra≤1.0 µm.

This is because the arithmetic average roughness Ra of the sliding contact surface needs to be 0.3 µm or greater in order to retain the grease and needs to be 1.0 µm or smaller in order to secure sealing performance at an initial stage of use of the seal.

The skewness of the roughness curve Rsk of each of Examples 1 to 3 and Comparative Examples 1 to 3 is a negative value. However, the skewness of the roughness curve Rsk of each of Examples 1 to 3 is smaller than −1.1 while Rsk of each of Comparative Examples 1 to 3 having rough surfaces finely formed by the shot blasting treatment is greater than −0.8.

Here, when the skewness of the roughness curve Rsk is the negative value, tip ends of peak portions protruding from an outer surface of the slinger are obtuse and gentle. The smaller the skewness of the roughness curve Rsk which is the negative value, the gentler the peak portions protruding from the outer surface of the slinger become.

The more acute the tip ends of the peak portions protruding from the outer surface of the slinger, the more likely plowing wear of rubber becomes to develop. The more obtuse the tip ends of the peak portions, the less likely the plowing wear of rubber becomes to develop. Therefore, the skewness of the roughness curve Rsk is the best preferably smaller than −1.1 and preferably equal to or smaller than −1 as in Examples 1 to 3 for the purpose of further reducing wear amounts of the lips.

The average length of the roughness curve element RSm in each of Examples 1 to 3 is equal to or longer than 100 µm while RSm in each of Comparative Examples 1 to 3 is shorter than 100 µm.

In each of the examples, the average length of the roughness curve element RSm is equal to or longer than 100 µm which is longer than in each of the comparative examples and therefore a pitch of repetition of the peak and the valley in the roughness curve is larger. In this way, the number of vibrations (chances of wear) per rotation reduces, which greatly reduces the wear amounts of the lips.

TABLE 1

| | Examples/Comparative Examples | | | | | |
|---|---|---|---|---|---|---|
| | Example 1 | Example 2 | Example 3 | Comparative Example 1 | Comparative Example 2 | Comparative Example 3 |
| | Slinger formed by press working on dull-finished material | | | Slinger in left column with lip sliding contact surfaces subjected to shot blasting treatment | | |
| Roughness Ra (µm) | 0.511 | 0.542 | 0.443 | 0.406 | 0.503 | 0.439 |
| parameters Rsk | −1.183 | −1.253 | −1.567 | −0.352 | −0.619 | −0.798 |
| RSm (µm) | 114.4 | 104.7 | 115.1 | 30.5 | 47.8 | 34.0 |
| Amount of grease | Normal | Very little | No grease | Normal | Very little | No grease |
| Wear amount of axial lip (mm) | 0.027 | 0.030 | 0.034 | 0.049 | 0.077 | 0.093 |
| Wear amount of radial lip (mm) | 0.027 | 0.032 | 0.069 | 0.046 | 0.106 | 0.122 |

As a result of the above-described differences in the roughness parameters between Examples 1 to 3 and Comparative Examples 1 to 3, as shown in Table 1 and FIG. 3, the wear amount of the axial lip in Example 1 is about 55% of that in Comparative Example 1, the wear amount of the axial lip in Example 2 is about 39% of that in Comparative Example 2, and the wear amount of the axial lip in Example 3 is about 37% of that in Comparative Example 3.

Moreover, as shown in Table 1 and FIG. 4, the wear amount of the radial lip in Example 1 is about 59% of that in Comparative Example 1, the wear amount of the radial lip in Example 2 is about 30% of that in Comparative Example 2, and the wear amount of the radial lip in Example 3 is about 57% of that in Comparative Example 3.

Therefore, in all of the cases in which the amount of grease is normal and very little and the case without grease, it can be seen that the wear amounts in the examples greatly reduced to about ½ to ⅓ those in the comparative examples.

By this effect, it is possible to suppress the wear of the lips even when the grease dries out due to long-term use.

According to the rotary seal in the present invention, each of the sliding contact surfaces A and B of the slinger 2 is in such a surface condition that the arithmetic average roughness Ra satisfies 0.3 µm≤Ra≤1.0 µm, the skewness of roughness curve Rsk satisfies Rsk≤1, and the average length of roughness curve element RSm satisfies 100 μm≤RSm, Ra, Rsk, and RSm defined by JIS B 0601:2013. Therefore, it is possible to greatly reduce the wear amounts of the seal lip portions to thereby increase reliability as compared with the sliding contact surfaces on which the uneven surfaces are formed by the surface machining such as the shot peening treatment as in Japanese Patent No. 4997532 and Japanese Patent No. 5234651.

Furthermore, even when the grease dries out due to long-term use, the wear of the lips can be suppressed and therefore it is possible to provide the rotary seal with higher reliability.

Because the slinger 2 is manufactured by press working on the dull-finished steel plate material, it is possible to reduce manufacturing cost as compared with the sliding contact surfaces on which the uneven surfaces are formed by the surface machining such as the shot peening treatment as in Japanese Patent No. 4997532 and Japanese Patent No. 5234651.

What is claimed is:

1. A rotary seal for use in a bearing device supporting a wheel of an automobile comprising:
    a core metal;
    a seal member having a base portion joined to the core metal and a seal lip portion; and
    a slinger having a first sliding contact surface and a second sliding contact surface, with each of which the seal lip portion comes in sliding contact, the slinger being made of a dull-finished steel plate material,
    wherein
    the slinger is formed by a cylindrical sleeve and a flange extending radially outward from one end in the axial direction of the sleeve,
    the first sliding contact surface is an inner surface of the flange of the slinger,
    the second sliding contact surface is an outer peripheral surface of the sleeve of the slinger,
    the seal lip portion of the seal member has an axial lip that comes in sliding contact with the first sliding contact surface, and a radial lip that comes in sliding contact with the second sliding contact surface,
    the first and second sliding contact surfaces of the slinger each have an uneven surface obtained without being subjected to surface machining,
    each of the first and second sliding contact surfaces has a surface condition that
    an arithmetic average roughness Ra satisfies 0.3 μm≤Ra≤1.0 μm,
    a skewness of roughness curve Rsk satisfies Rsk≤−1, and
    an average length of roughness curve element RSm satisfies 100 μm≤RSm, Ra, Rsk, and RSm defined by JIS B 0601:2013, thereby suppressing wear of the seal lip portion even when grease on each of the first and second sliding contact surfaces dries out.

2. The rotary seal according to claim 1, wherein
    the core metal is formed by a cylindrical core metal cylinder and a core metal flange extending radially inward from one end in an axial direction of the core metal cylinder.

3. A rotary seal for use in a beating device supporting a wheel of an automobile comprising:
    a core metal;
    a seal member having a base portion joined to the core metal and a seal lip portion; and
    a slinger having a first sliding contact surface and a second sliding contact surface, with each of which the seal lip portion comes in sliding contact, the slinger being made of a dull-finished steel plate material,
    wherein
    the slinger is formed by a cylindrical sleeve and a flange extending radially outward from one end in the axial direction of the sleeve,
    the first sliding contact surface is an inner surface of the flange of the slinger,
    the second sliding contact surface is an outer peripheral surface of the sleeve of the slinger,
    the seal lip portion of the seal member has an axial lip that comes in sliding contact with the first sliding contact surface, and a radial lip that comes in sliding contact with the second sliding contact surface,
    the first and second sliding contact surfaces of the slinger each have an uneven surface obtained without being subjected to surface machining,
    each of the first and second sliding contact surfaces has a surface condition that
    an arithmetic average roughness Ra satisfies 0.3 μm≤Ra≤1.0 μm,
    a skewness of roughness curve Rsk satisfies −1.6<Rsk≤−1, and
    an average length of roughness curve element RSm satisfies 100 μm≤RSm, Ra, Rsk, and RSm defined by JIS B 0601:2013, to thereby reduce wear amounts of the seal lip portion, thereby suppressing wear of the seal lip portion even when grease on each of the first and second sliding contact surfaces dries out.

4. The rotary seal according to claim 3, wherein
    the core metal is formed by a cylindrical core metal cylinder and a core metal flange extending radially inward from one end in an axial direction of the core metal cylinder.

5. A rotary seal for use in a bearing device supporting a wheel of an automobile comprising:
    a core metal;
    a seal member having a base portion joined to the core metal and a seal lip portion; and
    a slinger having a first sliding contact surface and a second sliding contact surface, with each of which the seal lip portion comes in sliding contact; the slinger being made of a dull-finished steel plate material,
    wherein
    the slinger is formed by a cylindrical sleeve and a flange extending radially outward from one end in the axial direction of the sleeve,
    the first sliding contact surface is an inner surface of the flange of the slinger,
    the second sliding contact surface is an outer peripheral surface of the sleeve of the slinger,
    the seal lip portion of the seal member has an axial lip that comes in sliding contact with the first sliding contact surface, and a radial lip that comes in sliding contract with the second sliding contact surface,
    the first and second sliding contact surfaces of the slinger each have an uneven surface obtained without being subjected to surface machining,
    each of the first and second sliding contact surfaces has a surface condition that
    an arithmetic average roughness Ra satisfies 0.3 μm≤Ra≤1.0 μm,
    a skewness of roughness curve Rsk satisfies −1.567<Rsk≤−1, and
    an average length of roughness curve element RSm satisfies 100 μm≤RSm, Ra, Rsk, and RSm defined by JIS B 0601:2013, thereby suppressing wear of the seal lip portion even when grease on each of the first and second sliding contact surfaces dries out.

6. The rotary seal according to claim 5, wherein
the core metal is formed by a cylindrical core metal cylinder and a core metal flange extending radially inward from one end in an axial direction of the core metal cylinder.

\* \* \* \* \*